(12) United States Patent
Cund et al.

(10) Patent No.: US 11,989,040 B2
(45) Date of Patent: *May 21, 2024

(54) CONTROLLING MOVEMENT OF A VEHICLE

(71) Applicant: JAGUAR LAND ROVER LIMITED, Warwickshire (GB)

(72) Inventors: Mark Cund, Coventry (GB); Martyn Lathbury, Coventry (GB); Allan Howling, Coventry (GB); Paul Widdowson, Coventry (GB); Colin Teed, Coventry (GB); Parvinder Devgun, Coventry (GB); Tony Davis, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 109 days.

This patent is subject to a terminal disclaimer.

(21) Appl. No.: 17/712,559

(22) Filed: Apr. 4, 2022

(65) Prior Publication Data

US 2022/0221882 A1    Jul. 14, 2022

Related U.S. Application Data

(63) Continuation of application No. 16/481,326, filed as application No. PCT/EP2018/051320 on Jan. 19, 2018, now Pat. No. 11,294,405.

(30) Foreign Application Priority Data

Jan. 30, 2017 (GB) ..................................... 1701443

(51) Int. Cl.
*G05D 13/62* (2006.01)
*B60W 30/14* (2006.01)
*G05D 1/00* (2006.01)

(52) U.S. Cl.
CPC ........... *G05D 13/62* (2013.01); *B60W 30/143* (2013.01); *G05D 1/0033* (2013.01); *G05D 2201/0213* (2013.01)

(58) Field of Classification Search
CPC ................. G05D 13/62; G05D 1/0033; G05D 2201/0213; G05D 1/0011; B60W 30/143
See application file for complete search history.

(56) References Cited

U.S. PATENT DOCUMENTS

| 3,976,151 A | 8/1976 | Farque |
| 9,358,975 B1 | 6/2016 | Watts |

(Continued)

FOREIGN PATENT DOCUMENTS

| JP | 2006285548 A | 10/2006 |
| JP | 2016036067 A | 3/2016 |

(Continued)

OTHER PUBLICATIONS

Combined Search and Examination Report under Sections 17 and 18(3) for Application No. GB1701443.2 dated Jul. 3, 2017.

(Continued)

*Primary Examiner* — Thomas Ingram
(74) *Attorney, Agent, or Firm* — Carlson, Gaskey & Olds, P.C.

(57) ABSTRACT

An apparatus for controlling vehicle movement comprises processing means configured to receive first signals from a receiving means arranged to receive transmitted signals from a remote control device indicating a requested motion of the vehicle. From the first signals or an additional signal received from a sensing means, one or more distance values indicative of a distance from a point on the vehicle to an object is determined, and a maximum speed value for the vehicle is determine in dependence on the one or more distance values. The processing means provides an output (Continued)

signal for controlling speed of the vehicle based on the requested motion. The output signal is arranged to control the speed of the vehicle to be less than or equal to the maximum speed value.

1 Claim, 12 Drawing Sheets

(56) References Cited

U.S. PATENT DOCUMENTS

| | | |
|---|---|---|
| 2007/0073473 A1 | 3/2007 | Altan et al. |
| 2012/0166034 A1 | 6/2012 | Wragg |
| 2013/0197760 A1 | 8/2013 | Castaneda et al. |
| 2013/0268142 A1 | 10/2013 | Du et al. |
| 2018/0370526 A1 | 12/2018 | Ohmura |
| 2019/0079529 A1 | 3/2019 | Kamata |
| 2021/0253090 A1* | 8/2021 | Hayakawa ............ B60W 30/06 |
| 2023/0258019 A1* | 8/2023 | Smart ................... E05B 85/107 292/336.3 |

FOREIGN PATENT DOCUMENTS

| | | |
|---|---|---|
| WO | 2011/027176 A1 | 3/2011 |
| WO | 2015/068032 A1 | 5/2015 |

OTHER PUBLICATIONS

International Search Report and Written Opinion of the International Searching Authority for International application No. PCT/EP2018/051320 dated Apr. 3, 2018.

Notice of First Examination Opinion, CN Application No. 20188000775.X dated Oct. 26, 2021.

* cited by examiner

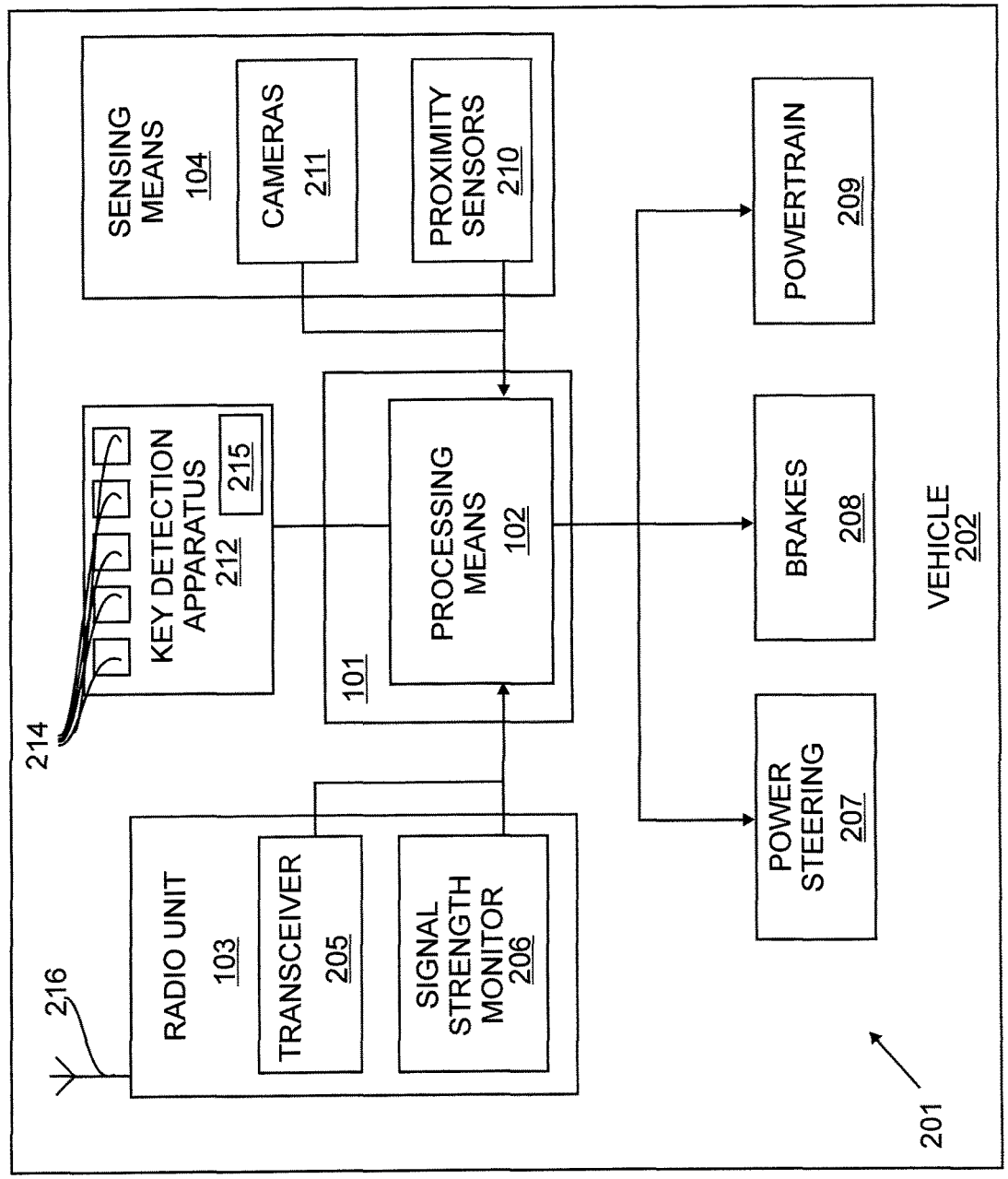
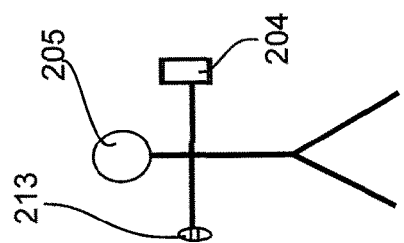
Fig. 2

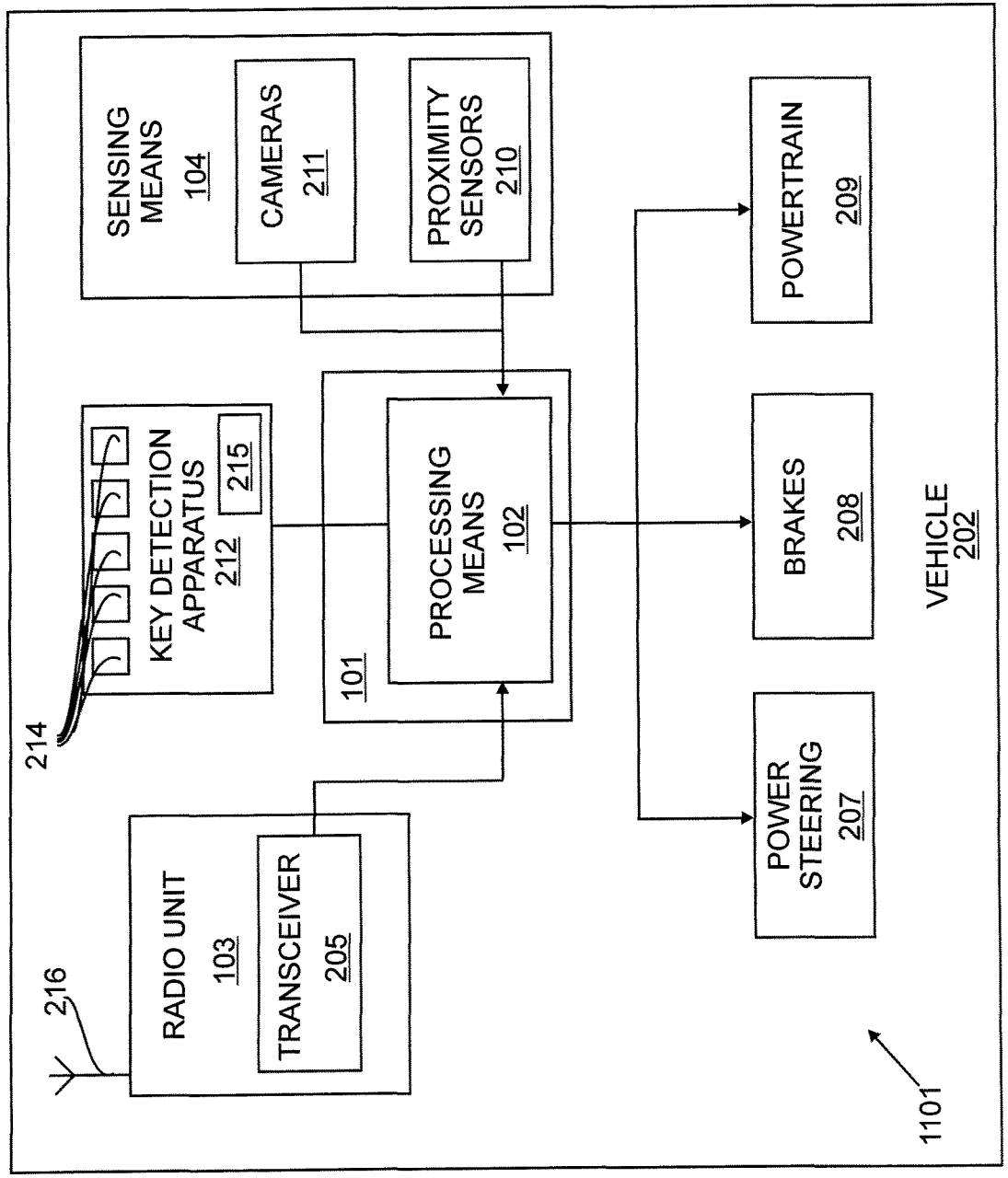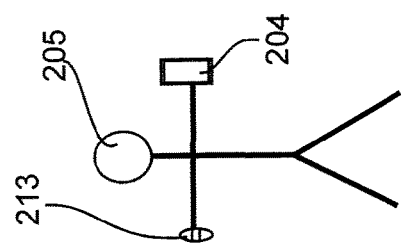
Fig. 11

US 11,989,040 B2

CONTROLLING MOVEMENT OF A VEHICLE

CROSS REFERENCE TO RELATED APPLICATIONS

This application is a continuation of U.S. patent application Ser. No. 16/481,326, filed on Aug. 26, 2019, which is the national stage application of International Application No. PCT/EP2018/051320, filed Jan. 19, 2018, which claims priority to United Kingdom Application No. GB 1701443.2, filed Jan. 30, 2017.

TECHNICAL FIELD

The present disclosure relates to controlling movement of a vehicle. In particular, but not exclusively it relates to controlling movement of a road vehicle such as a car.

Aspects of the invention relate to an apparatus, a system, a vehicle, a method and a computer program.

BACKGROUND

Providing a road vehicle with means for enabling it to be moved by remote control using a mobile phone application has been proposed. One problem with such an arrangement is how to maximize the safety of the vehicle and people within the vicinity of the vehicle, including the vehicle operator, while the vehicle is being remotely controlled.

It is an aim of the present invention to address this problem.

SUMMARY OF THE INVENTION

Aspects and embodiments of the invention provide an apparatus, a system, a vehicle, a method and a computer program as claimed in the appended claims.

According to an aspect of the invention there is provided an apparatus for controlling movement of a vehicle, the apparatus comprising processing means that, in a remote control mode, is configured to: receive a first signal from a receiving means in dependence on a transmitted signal received from a remote control device indicating a requested motion of a vehicle; receive a further signal from a key detection means configured to receive a key signal from a smart key for the vehicle; determine, from the first signal or from an additional signal received from a sensing means, one or more distance values, the or each distance value being indicative of a distance from a point on the vehicle to an object; determine a maximum speed value for the vehicle in dependence on at least one of the one or more distance values and on the further signal being indicative of a smart key being detected; and provide an output signal for controlling speed of the vehicle based on the requested motion, wherein the output signal is arranged to control the speed of the vehicle to be less than or equal to the maximum speed value.

The apparatus may be an electronic control unit (ECU). The output signal may be for providing to a powertrain and/or a brake mechanism of the vehicle to control its speed.

This provides the advantage that the speed of the vehicle may be limited in dependence on the distance from the vehicle to nearby obstacles, such as an inanimate object or the person controlling the vehicle using the remote control device. This enables the speed to be restricted to a relatively slow speed when the distance to obstacles is relatively small, and so the likelihood of the vehicle being safely moved by remote control is increased.

According to another aspect of the invention there is provided an apparatus for controlling movement of a vehicle, the apparatus comprising processing means configured to: receive first signals from a receiving means arranged to receive transmitted signals from a remote control device indicating a requested motion of a vehicle; determine a distance value from the first signals indicative of a distance from an aerial on the vehicle to the remote control device; determine a maximum speed value for the vehicle in dependence on the distance value; and provide an output signal for controlling speed of the vehicle based on the requested motion, wherein the output signal is limited dependent upon the maximum speed value.

This provides the advantage that the speed of the vehicle may be limited in dependence on the distance from the vehicle to the person controlling the vehicle using the remote control device, so that the vehicle may be made to move relatively slowly when the distance is relatively small and allowed to move relatively quickly when the distance is relatively larger. In this way, the safety of the person controlling the vehicle may be increased.

According to another aspect of the invention there is provided an apparatus for controlling movement of a vehicle, the apparatus comprising processing means configured to: receive first signals indicative of a signal strength of received transmitted signals from a remote control device indicating a requested motion of a vehicle; determine a maximum speed value for the vehicle in dependence on the first signals; and provide an output signal for controlling speed of the vehicle based on the requested motion, wherein the output signal is limited dependent upon the maximum speed value.

This provides the advantage of enabling the speed of the vehicle to be limited to a relatively slow speed when the signal strength is very high indicating that the remote control device is very close to the vehicle and enabling the speed of the vehicle to be limited to a relatively higher speed when the signal strength is lower indicating that the remote control device is a safe distance from the vehicle. It also enables the vehicle to be limited to a relatively slow speed when the signal strength is very low indicating that the remote control device approaching a distance at which the communication between the remote control device and the vehicle may become unreliable.

According to another aspect of the invention there is provided an apparatus for controlling movement of a vehicle, the apparatus comprising processing means configured to: receive data included within signals transmitted from a remote control device indicating a requested motion of a vehicle; receive an additional signal from a sensing means indicative of a distance from a point on the vehicle to an obstacle; determine a maximum speed value for the vehicle in dependence on the additional signal; and provide an output signal for controlling speed of the vehicle based on the requested motion, wherein the output signal is limited dependent upon the maximum speed value.

This provides the advantage that the speed of the vehicle may be limited in dependence on the distance from the vehicle to nearby obstacles, such as an inanimate object or the person, detected by the sensing means.

According to another aspect of the invention there is provided an apparatus for controlling movement of a vehicle, the apparatus comprising an electronic memory device having instructions stored therein and an electronic processor configured to access the electronic memory device and execute the instructions stored therein such that it is operable to: receive first signals from a radio unit arranged to receive transmitted signals from a remote control device indicating a requested motion of a vehicle; determine, from the first signals or at least one additional signal received from at least one sensor, a distance value indicative of a distance from a point on the vehicle to an obstacle; determine a maximum speed value for the vehicle in dependence on the distance value; and provide an output signal for controlling speed of the vehicle based on the requested motion, wherein the output signal is limited dependent upon the maximum speed value.

In some embodiments the first signals provide an indication of signal strength of the received transmitted signals. This provides the advantage that the processing means is able to determine a distance from a remote control device to a receiving means located on the vehicle from the signal strength indication.

In some embodiments the processing means is configured to determine the one or more distance values from the first signals. This provides the advantage that the speed of the vehicle may be limited in dependence on the distance from the vehicle to the person controlling the vehicle using the remote control device.

In some embodiments the processing means is configured to determine the one or more distance values from an additional signal received from a sensing means. This provides the advantage that the speed of the vehicle may be limited in dependence on the distance from the vehicle to any nearby objects, such as an inanimate objects or people, that are detectable by the sensing means and which may present an obstacle to movement of the vehicle.

In some embodiments the processing means is configured to: determine a first distance value from the first signals and a second distance value from the additional signal received from the sensing means; and determine the maximum speed value in dependence on the first distance value or the second distance value. The processing means may be configured to: compare the first distance value and the second distance value to determine which is smallest; and determine the maximum speed value in dependence on the smallest one of the first distance value and the second distance value.

The processing means may be configured to: determine a first speed value from the first distance value; determine a second speed value from the second distance value; and determine the maximum speed value as the lower one of the first speed value and the second speed value. This provides the advantage that a safe speed limit may be calculated in regard to the distance to the remote control device held by the person controlling the vehicle and a second safe speed limit with regard to the distance to the nearest object detected by the sensing means, and the vehicle may be limited to the least of these two speeds to assist safe movement of the vehicle.

In some embodiments the processing means is configured to: receive a plurality of additional signals, each additional signal being received from a respective one of a plurality of sensors; and perform a process of sensor fusion to obtain the, or each, distance value. This provides the advantage of basing the maximum speed value on a more accurate distance value than would be obtained from an individual sensor.

In some embodiments the transmitted signal comprises information indicating at least one of: a requested speed of the vehicle, a request to apply brakes of the vehicle, a requested steering angle, a requested direction of travel, a requested gear selection and a requested amount of power provided by a powertrain of the vehicle.

In some embodiments the processing means is configured to determine from the first signal a distance value indicative of the distance from the point on the vehicle to the remote control device.

In some embodiments the sensing means comprises one or more of a camera, an ultrasonic proximity sensor and an electromagnetic proximity sensor. This provides the advantage that electronic sensors present within the vehicle for other purposes, such as assisting parking, may be used to limit the speed of the vehicle when being remotely controlled.

Determining a maximum speed value in dependence on the further signal being indicative of a smart key being detected provides the advantage of providing a well-defined zone around the vehicle in which the speed of the vehicle can be kept below a relatively low maximum speed when the person in possession of the key is within the zone.

In the remote control mode, the processing means may be configured to provide an output signal to cause the vehicle to be stationary in dependence on the further signal being indicative of the smart key being within the vehicle.

In some embodiments the processing means is configured to compare a signal strength of the transmitted signal with at least one threshold value and to determine a distance value in dependence thereon.

In some embodiments the processing means is configured to: compare a signal strength of the transmitted signal to a first threshold value and a second threshold value; and produce a first maximum speed value in dependence on the signal strength of the transmitted signal being determined to be above the first threshold value and produce a second maximum speed value in dependence on the signal strength of the transmitted signal being determined to be below the first threshold value and above the second threshold value, and wherein the first maximum speed value is less than the second maximum speed value.

The processing means may be configured to produce a third maximum speed value in dependence on the signal strength of the transmitted signal being determined to be below the second threshold value, and wherein the third maximum speed value is below the second maximum speed value.

The processing means may be configured to compare signal strength of the transmitted signals to a third threshold value and cause the vehicle to stop in dependence on the signal strength of a transmitted signal being below the third threshold value. This provides the advantage that the vehicle is safely brought to a standstill before the communication between the remote control device and the vehicle become unreliable due to the signal becoming too weak.

In some embodiments the processing means comprises an electronic processor communicatively coupled to an electronic memory device having instructions stored therein and the electronic processor having an electrical input for receiving the first signal; and the sensing means comprises at least one electronic sensor for providing a signal indicative of a distance to an object.

According to another aspect of the invention there is provided a system for controlling the movement of a vehicle comprising the apparatus according to any one of the previous paragraphs, a receiving means for receiving the transmitted signals from a remote control device via a wireless local area network.

In an embodiment, the receiving means includes a signal strength monitor arranged to perform a measurement of power of signals received from a remote control device and generate the first signals in dependence on the measurement.

According to another aspect of the invention there is provided a vehicle comprising an apparatus or a system as described above, wherein the speed of the vehicle is limited to a speed dependent on the maximum speed value determined from the distance value.

According to another aspect of the invention there is provided a method of controlling movement of a vehicle, the method comprising: receiving a first signal from a receiving means in dependence on transmitted signal from a remote control device indicating a requested motion of a vehicle; receiving further signals from a key detection means configured to receive signals from a smart key of the vehicle; determining, from the first signal or an additional signal received from a sensing means, one or more distance values, the or each distance value being indicative of a distance from a point on the vehicle to an object; determining a maximum speed value for the vehicle in dependence on at least one of the one or more distance values and on the further signal being indicative of a smart key being detected; and providing an output signal for controlling speed of the vehicle based on the requested motion, wherein the output signal controls speed of the vehicle to be less than or equal to the maximum speed value.

This provides the advantage that the speed of the vehicle may be limited in dependence on the distance from the vehicle to nearby obstacles, such as an inanimate object or the person controlling the vehicle using the remote control device.

In an embodiment the determining a maximum speed value comprises: determining a first distance value from the first signal and a second distance value from an additional signal received from a sensing means; and determining the maximum speed value in dependence on the first distance value or the second distance value.

This provides the advantage that the distance from the vehicle to nearby obstacles, and the distance to the person controlling the vehicle using the remote control device may be taken into account when limiting the speed of the vehicle.

The determining the maximum speed value in dependence on the first distance value or the second distance value may comprise: determining a first speed value from the first distance value; determining a second speed value from the second distance value; and determining the maximum speed value as the lower one of the first speed value and the second speed value. This provides the advantage that a safe speed limit may be calculated in regard to the distance to the remote control device held by the person controlling the vehicle and a second safe speed limit with regard to the distance to the nearest object detected by the sensing means, and the vehicle may be limited to the least of these two speeds to assist safe movement of the vehicle.

In an embodiment the method comprises receiving a plurality of additional signals, each additional signal being received from a respective one of a plurality of sensors; and performing a process of sensor fusion to obtain the, or each, distance value. This provides the advantage of basing the maximum speed value on a more accurate distance value than would be obtained from an individual sensor.

In an embodiment the transmitted signals comprise information indicating at least one of: a requested speed of the vehicle, a request to apply brakes of the vehicle, a requested steering angle, a requested direction of travel, a requested gear selection and a requested amount of power provided by a powertrain of the vehicle and said providing an output signal comprises providing an output signal to at least one of a brakes mechanism and a powertrain, to cause the speed of the vehicle to be less than or equal to a speed corresponding to the maximum speed value.

Providing an output signal to cause the speed of the vehicle to be less than or equal to a first speed in dependence on the further signal being indicative of a smart key being detected provides the advantage of providing a well-defined zone around the vehicle in which the speed of the vehicle can be kept below a relatively low maximum speed when the person in possession of the key is within the zone.

According to a still further aspect of the invention there is provided a computer program that, when run on a processor, performs a method as described above.

According to a still further aspect of the invention there is provided a non-transitory computer readable medium comprising a computer program that, when run on a processor, performs a method as described above.

The apparatus may be for controlling the movement of a road vehicle such as a car.

In some, but not necessarily all, examples of by the present disclosure there is provided an apparatus for controlling movement of a vehicle, the apparatus comprising processing means that, in a remote control mode, is configured to: receive a first signal from a receiving means in dependence on a transmitted signal received from a remote control device indicating a requested motion of a vehicle; determine, from the first signal or from an additional signal received from a sensing means, one or more distance values, the or each distance value being indicative of a distance from a point on the vehicle to an object; determine a maximum speed value for the vehicle in dependence on at least one of the one or more distance values; and provide an output signal for controlling speed of the vehicle based on the requested motion, wherein the output signal is arranged to control the speed of the vehicle to be less than or equal to the maximum speed value.

A system for controlling the movement of a vehicle comprising this apparatus, a receiving means for receiving the transmitted signals from a remote control device via a wireless local area network is also disclosed.

A vehicle comprising one of these apparatus or system, wherein the speed of the vehicle is limited to a speed dependent on the maximum speed value determined from the distance value is also disclosed.

In some, but not necessarily all, examples of by the present disclosure there is provided a method of controlling movement of a vehicle, the method comprising: receiving a first signal from a receiving means in dependence on transmitted signal from a remote control device indicating a requested motion of a vehicle; determining, from the first signal or an additional signal received from a sensing means, one or more distance values, the or each distance value being indicative of a distance from a point on the vehicle to an object; determining a maximum speed value for the vehicle in dependence on the one or more distance values; and providing an output signal for controlling speed of the vehicle based on the requested motion, wherein the output signal controls speed of the vehicle to be less than or equal to the maximum speed value.

A computer program that, when run on a processor, performs this method is also disclosed.

A non-transitory computer readable medium comprising a computer program that, when run on a processor, performs this method is also disclosed.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 2 shows a block diagram of a system 201 incorporating the apparatus 101 within a vehicle 202;

FIG. 11 shows an alternative system 1101 embodying the invention that differs from system 201 of FIG. 2 in that the signal strength monitor 206 is omitted;

DETAILED DESCRIPTION

Figure 1:
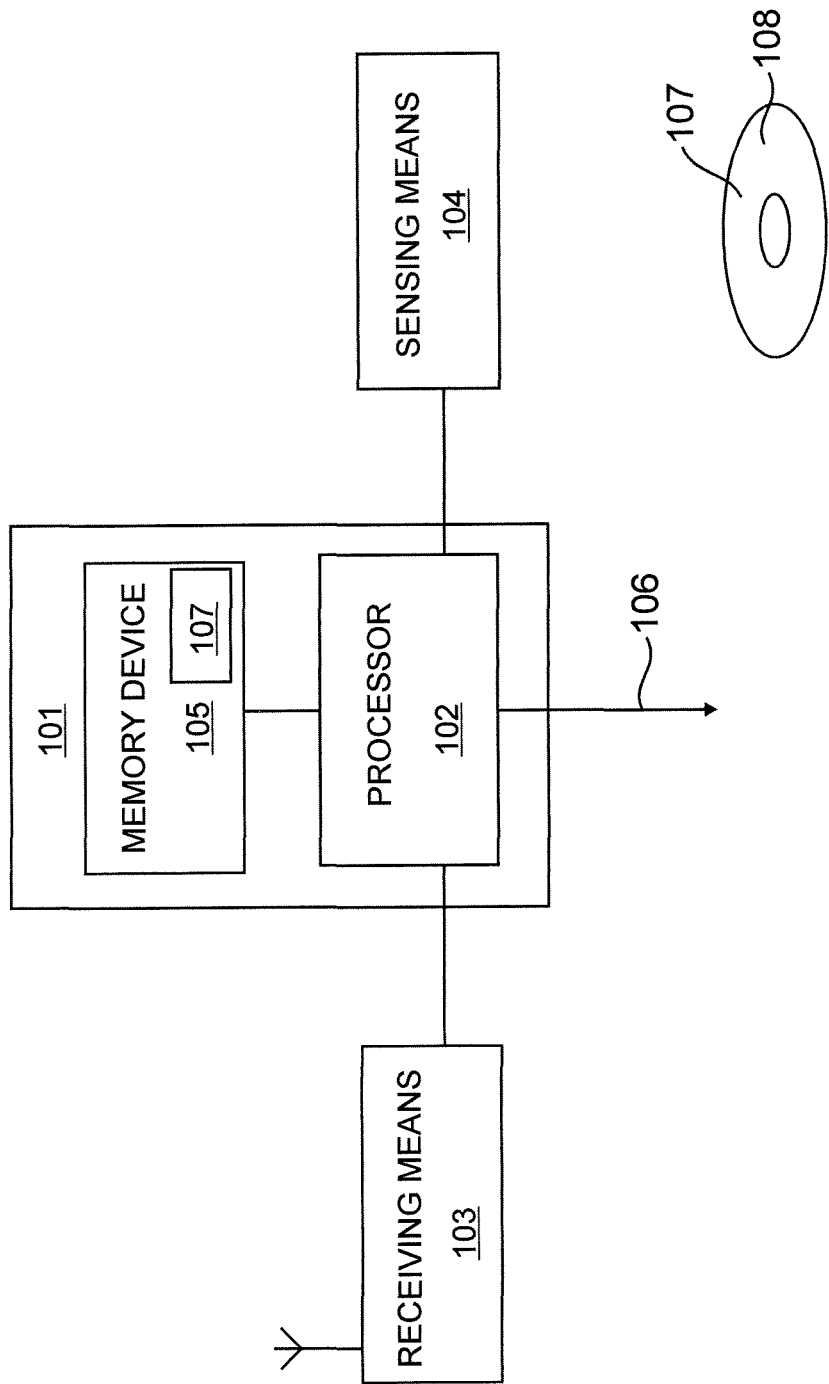
FIG. 1 shows a block diagram of an apparatus 101 for controlling the movement of a vehicle.

The Figures illustrate Apparatus 101 for controlling movement of a vehicle 202, the apparatus 202 comprising processing means 102 that, in a remote control mode, is configured to: receive a first signal from a receiving means 103 in dependence on a transmitted signal received from a remote control device 204 indicating a requested motion of a vehicle 202; determine, from the first signal or from an additional signal received from a sensing means 104, one or more distance values, the or each distance value being indicative of a distance from a point on the vehicle 202 to an object; determine a maximum speed value for the vehicle 202 in dependence on at least one of the one or more distance values; and provide an output signal 106 for controlling speed of the vehicle 202 based on the requested motion, wherein the output signal 106 is arranged to control the speed of the vehicle 202 to be less than or equal to the maximum speed value.

The maximum speed value may be a maximum speed to which the vehicle is limited by limiting the output signal, or may be indicative of such a maximum speed. Thus, the output signal is limited so that the controlled speed of the vehicle is kept below a maximum speed indicated by the maximum speed value.

The output signal may be for providing to a powertrain and/or a brake mechanism of the vehicle to control its speed.

An example of an apparatus 101 for controlling movement of a vehicle 202 is shown in FIG. 1. The apparatus 10 may comprise an electronic control unit for controlling movement of the vehicle. The apparatus 101 comprises processing means 102, which, as shown in FIG. 1, may comprise an electronic processor 102 arranged to execute instructions 107 stored within an electronic memory device 105 to perform a method embodying the present invention. The instructions may be provided to the memory device 105 via a computer-readable storage medium, for example, a non-transitory storage medium 108.

The processing means 102 is configured to receive first signals from a receiving means 103 arranged to receive transmitted signals from a remote control device indicating a requested motion of a vehicle. The processing means may be arranged to also receive additional signals from sensing means 104 that are located within the vehicle where the processing means 102 is located. The additional signals may comprise information relating to a distance to an obstacle.

The processing means 102 is further configured to determine, from the first signals received from the receiving means or an additional signal received from the sensing means 104, a distance value dependent upon a distance from a point on the vehicle 202 to an obstacle. In the case where the processing means 102 is configured to determine the distance value from the first signals, the first signals may include information relating to the signal strength of the received transmitted signals.

The processing means 102 is also configured to determine a maximum speed value for the vehicle 202 in dependence on the determined distance value and provide an output signal 106 for controlling speed of the vehicle 202 based on the requested motion, wherein the output signal 106 is limited dependent upon the maximum speed value. That is, the output signal 106 is dependent upon the requested motion indicated by the signal received from the remote control device, so that the output signal 106 may control, or be used to control, a powertrain of the vehicle and/or a brake mechanism, but the output signal is limited in order to limit the maximum possible speed of the vehicle.

An example of a system 201 incorporating the apparatus 101 is shown in FIG. 2 within a vehicle 202. The system 201 includes the apparatus 101 of FIG. 1 and a receiving means 103 in the form of a radio unit. The radio unit 103 may comprise a receiver and a transmitter or, as shown in FIG. 2, a transceiver 205 configured to receive radio signals transmitted from a remote control device 204 and transmit signals to the remote control device 204. The radio unit 103 and the remote control device 204 may be arranged to provide a wireless local area network, via which two-way communication may take place between the radio unit 103 and the remote control device 204. For example, the radio unit 103 may be arranged to communicate by WiFi with the remote control device 204. In alternative embodiments other radio communication standards may be used for the communication. In one example, communication between the radio unit 103 and the remote control device is provided via Bluetooth.

The remote control device 204 may be a portable device, which may be carried and used by a person 205 outside of the vehicle 202. In an example, the remote control device 204 comprises a mobile phone (or cell phone) having an application to enable the person 205 to provide manual inputs to request movement of the vehicle 202. For example, the manual inputs may include an indication of required throttle and braking, or a required speed, as well as required steering. The remote control device 204 is arranged to include data, indicative of the received user inputs, within the signals transmitted to the radio unit 103. The radio unit 103 is arranged to extract this data and provide the data to the processing means.

The radio unit 103 may also comprise a signal strength monitor 206 for measuring the signal strength of the received signals transmitted by the remote control device 204. The signal strength monitor 206 is arranged to provide first signals to the processing means 102 indicating the strength of the currently received transmitted signal.

The system 201 further comprises a number of actuators for effecting movement of the vehicle 202. In the present embodiment, the actuators comprise a power steering mechanism 207 arranged to provide steering of the wheels of the vehicle in dependence on signals received from the processing means 102. A second actuator comprises a powered braking mechanism 208 arranged to actuate brakes of the vehicle in dependence on signals received from the processing means 102. A third actuator comprises a powertrain 209 arranged to provide power, or torque, to cause forward or backward movement of the vehicle in dependence on output signals 106 received from the processing means 102.

The system 201 may also include sensing means 104, which may comprise proximity sensors 210 that are known for use to assist parking of the vehicle. The proximity sensors 210 may comprise ultrasonic proximity sensors but alternatively may be electromagnetic proximity sensors. Such sensors are known to be provided on vehicles to assist a driver when parking.

Each of the proximity sensors 210 may be arranged to provide sensor signals to the processing means 102 indicative of a distance from the sensor to the obstacle nearest to that sensor. The processing means 102 may be configured to process the signals from the sensors 210 by performing sensor fusion (or multi sensor data fusion) to obtain a more accurate indication of the distance from the vehicle 202 to the nearest obstacle to the vehicle. That is, data received from the sensors 210 may be combined so that the resulting indication of distance has less uncertainty than it would have if the data from each sensor were used individually.

The sensing means 104 may also comprise one or more cameras 211 located within the vehicle 202 that are configured to provide a signal to the processing means 102 indicative of a distance to a nearest obstacle.

The system 201 may also comprise key detection apparatus 212 configured to detect the presence of a smart key 213 of the vehicle 202, as is known in the art. Such smart keys are known for use with vehicles having a system that allows passive entry to the vehicle and passive start of the vehicle. The key detection apparatus 212 may be arranged to provide a signal to the processing means indicative of whether a smart key 213 for the vehicle 202 has been detected.

The key detection apparatus 212 may comprise several key detectors 214 for detecting the smart key 213 and may comprise a processing component 215 for receiving signals from the key detectors 214 and for determining whether the smart key 213 is located inside or outside of the vehicle, as is known. Thus the signal provided to the processing means 102 may also indicate whether the key is inside or outside of the vehicle 202. In an alternative arrangement, the processing to determine whether the smart key 213 is inside or outside of the vehicle may be performed by the processing means 102.

In one embodiment, the radio unit 103 may be activated by the processing means 102 in response to receiving a key detection signal from the key detection apparatus 212. For example, a user 205 may be required to bring the smart key 213 within detection distance of the key detection apparatus 212 and wake up the key detection apparatus 212 by pulling a door handle, pressing an unlock button on the vehicle, or another action used for accessing the vehicle.

The system 201 enables a person 205 to control movements of the vehicle 202 by remote control by providing user inputs to the remote control device 204. To enable such remote control, a two-way communication link is firstly established between the remote control device 204 and the radio unit 103. With the link established the remote control device 204 may then be used to indicate to the processing means 102 that a remote control mode enabling remote control movement of the vehicle 202 is requested. The processing means 102 may determine whether one or more criteria are met before enabling remote control of the vehicle. For example, the processing means 102 may determine whether the smart key 213 is present within the vehicle 102 and if it is, then remote control movement may be disabled or the maximum allowed speed of the vehicle may be set at zero.

With the communication link established, the user 205 of the remote control device 204 is then able to provide manual inputs to the remote control device 204 to request movement of the vehicle, including an increase or decrease in speed or power, an increase or decrease braking, and steering. The remote control device 204 may generate data including information defining the requested movement, which is then transmitted to the radio unit 103 via the communication link.

The transceiver 205 of the radio unit 103 determines the data defining the movement requested by the remote control device 204 and provides the data to the processing means 102. The processing means 102 provides output signals to the power steering 207, the brakes 208 and the powertrain 209 in dependence on the received data, and thus the user 205 is able to operate the vehicle 202 remotely. However, the output signal 106 provided to the brakes 208 and the powertrain 209 may also be dependent upon the maximum speed value mentioned above and which may be determined as described below. Specifically, whatever the speed of vehicle is requested by the remote control device 204, the processing means 102 provides output signals 106 to the brakes 208 and/or the powertrain 209 to adjust the speed of the vehicle 202 to be no more than a speed corresponding to the maximum speed value.

That is, the speed of the vehicle is limited to be no more than a speed corresponding to the maximum speed value.

For example, where the data from the remote control device 204 relates to a user request for increased engine power and/or decreased braking that could increase the speed to 3 kilometres per hour, and the maximum speed value corresponds to 1 kilometre per hour, the processing means 102 provides output signals to the brakes and powertrain to cause a speed of only 1 kilometre per hour.

In some instances, the speed requested by the remote control device 204 may be unchanged over a period of time, but the determined maximum speed value may become smaller than the current speed of the vehicle and as a result the output signals 106 to the powertrain and/or brakes may be adjusted to reduce the speed of the vehicle so that it corresponds to the maximum speed value.

The maximum speed value may be determined in dependence upon signals received by the processing means 102 from the signal strength monitor 206 of the radio unit 103. The signal strength monitor 206 may measure the power of the signal received from the remote control device 204 and provide a first signal to the processing means indicative of the measured power. The processing means 102 may process the first signal to determine a distance value dependent upon a distance from the aerial 216 of the radio unit 103 to the remote control device 204. This distance may be regarded as a distance from the vehicle to the user 205 operating the remote control device 204 who provides an obstacle to the movement of the vehicle.

The processing means 102 may determine a maximum speed value for the vehicle 202 in dependence on the distance value determined from the first signal. For example, where the distance is relatively small, such as less than two metres, the maximum speed value may be set at a relatively low speed, such as 1 kilometre per hour. This low speed will minimize the possibility of the user 205 of the remote control device 204 accidentally causing the vehicle to collide with the user 205. When the distance is relatively large, such as between 2 metres and 7 metres, the maximum speed value may be set at a larger value, such as 6 kilometres per hour. This will allow the user to move the vehicle at a greater speed when they are at a safe distance from the vehicle. When the distance is determined to be relatively very large, such between 7 metres and 15 metres, the maximum speed value may be set at a relatively smaller value, such as 1 or 2 kilometres per hour. This range of distances may be chosen to be just smaller than the expected limit of the radio link between the remote control device 204 and the radio unit 103, so that the vehicle is slowed before a loss in radio communication could occur. If the determined distance is very large, for example over 15 metres, the maximum speed value may be set at zero.

In embodiments where the processing means 102 also receives a further signal from the key detection apparatus 212, the maximum speed value may be also dependent upon that further signal. For example, if the smart key is detected outside of the vehicle and the key detection sensors are only capable of detecting the smart key at a distance of a few metres, this indicates that a user who is in possession of the key is also within a few metres of the vehicle, and so the speed of the vehicle should be kept at a relatively low speed to avoid the possibility of the vehicle hitting the user.

In embodiments where the processing means 102 is arranged to use the key detection apparatus 212 in this way, the key detection apparatus is maintained in an operational mode while ever the processing means 102 is in its remote control mode. That is, during the remote control mode, the key detection apparatus 212 is caused to repeatedly transmit a signal requesting acknowledgement from the smart key.

In arrangements where the processing means 102 also receives additional signals from the sensing means 104, such as the sensors 210 or cameras 211, the processing means 102 may determine, from the additional signals, a distance value dependent upon a distance from a point on the vehicle 202 to a nearby obstacle. When the distance to the obstacle is relatively small, it is desirable that the maximum speed of the vehicle is kept relatively low to minimize the possibility of collision with the obstacle. Thus, the processing means 102 may determine a maximum speed value for the vehicle 202 in dependence on the distance value, so that the speed of the vehicle is limited to a relatively low speed when the distance is small and a relatively larger speed when the distance is larger.

In an embodiment such as that shown in FIG. 2, the maximum speed value may be determined in dependence on the first signals received from the signal strength monitor 206 and the additional signals received from the sensing means 104. For example, the processing means may be configured to determine a first distance value from the first signals and a second distance value from additional signals received from a sensor and to determine the maximum speed value in dependence on the first distance value or the second distance value. For example, the processing means 102 may be arranged to compare the first distance value and the second distance value to determine which is smallest and determine the maximum speed value in dependence on the smallest one of the first distance value and the second distance value.

Alternatively, the processing means 102 may be configured to determine a first maximum speed value from the first signals received from the signal strength monitor 206 and a second maximum speed value from the additional signals received from the sensing means 104 and determine a maximum speed value, which is used to limit the maximum speed of the vehicle, that is the smaller of the first and second maximum speed values.

The maximum speed value may also be dependent on the further signals from the key detection apparatus 212. For example, even if the first signals from the signal strength monitor suggest that the user 205 is relatively distant from the vehicle, the further signals produced by the key detection apparatus 212, indicating detection of the smart key 213, may cause the processing means 102 to set the maximum speed value at a relatively low speed.

An example of an alternative system 1101 in which the signal strength monitor 206 is omitted is shown in FIG. 11. The system 1101 may be just like the system 201 of FIG. 2 except of the omission of the signal strength monitor. In this embodiment, the maximum speed value may be determined in dependence sensor signals received from the sensing means 104. The maximum speed value may also be dependent on the further signals from the key detection apparatus 212. For example, the maximum speed value may be set at a relatively large value, for example 6 kilometres per hour provided no obstacles are detected by the sensing means 104 that are closer than 2.5 metres and/or the smart key 213 is not detected by the key detection apparatus 212.

Figure 12:
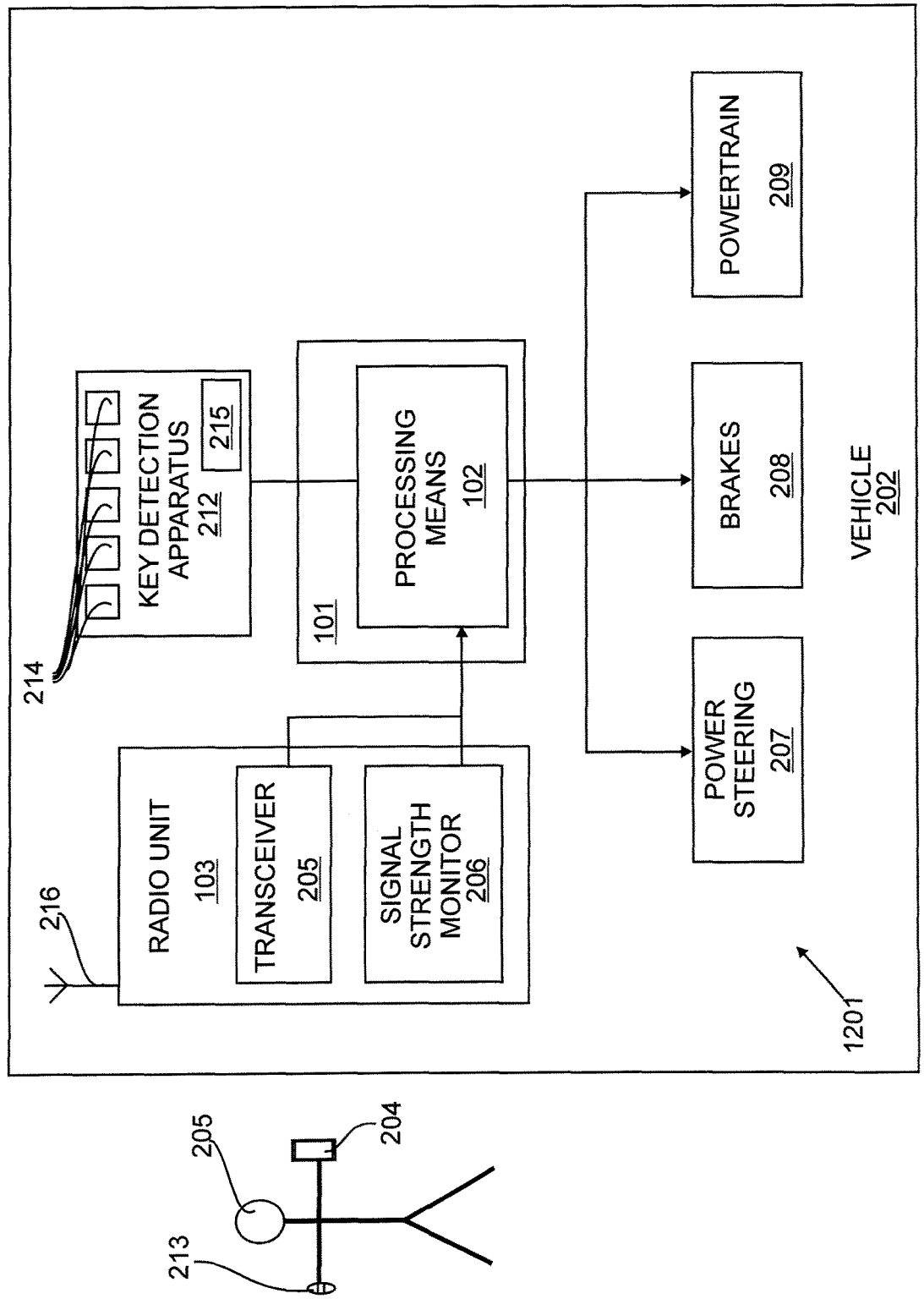
FIG. 12 shows a system 1201 embodying the present invention that differs from system 201 of FIG. 2 in that it does not include the sensing means 104.

In alternative systems, the signals from the sensing means 104 may not be taken into account when determining the maximum speed value. An example of a system 1201 that differs from system 201 in that it does not include the sensing means 104 is shown in FIG. 12. In this embodiment, the maximum speed value may be determined only in dependence on the first signals received from the signal strength monitor 206, or may also be dependent upon the further signals from the key detection apparatus 212.

Figure 13:
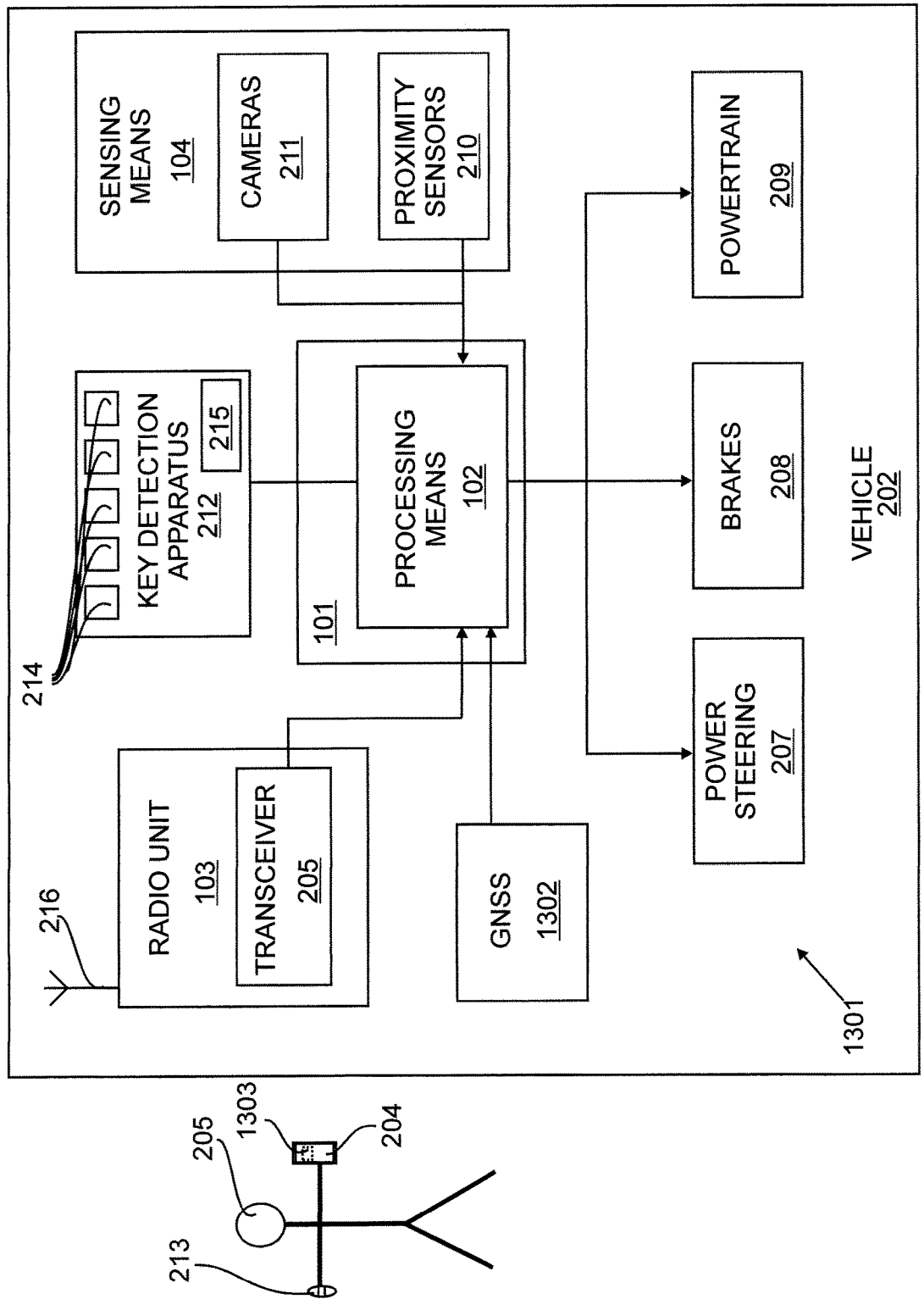
FIG. 13 shows another alternative system 1301 embodying the present invention that differs from system 201 of FIG. 2 in that it includes a global navigation satellite system (GNSS) module 1302.

Another alternative system 1301 is shown in FIG. 13. The system 1301 differs from system 201 of FIG. 2 in that it includes a global navigation satellite system (GNSS) module 1302, such as a GPS (global positioning system) module for receiving satellite signals and determining location data from those signals. The signal strength monitor 206 may be omitted in this embodiment. The remote control device 204 is also provided with a global navigation satellite system module 1303. The remote control device 204 is arranged to determine its own location from the satellite signals and include location data identifying its location when transmitting to the radio unit 103. The processing means 102 is arranged to compare the received location data, received via the radio unit 103, with the location data from the GNSS module 1302 of the vehicle's system to determine the distance between the vehicle 202 and the remote control device 204. This distance may then be used as described above, to determine the maximum speed value for the vehicle.

Figure 3:
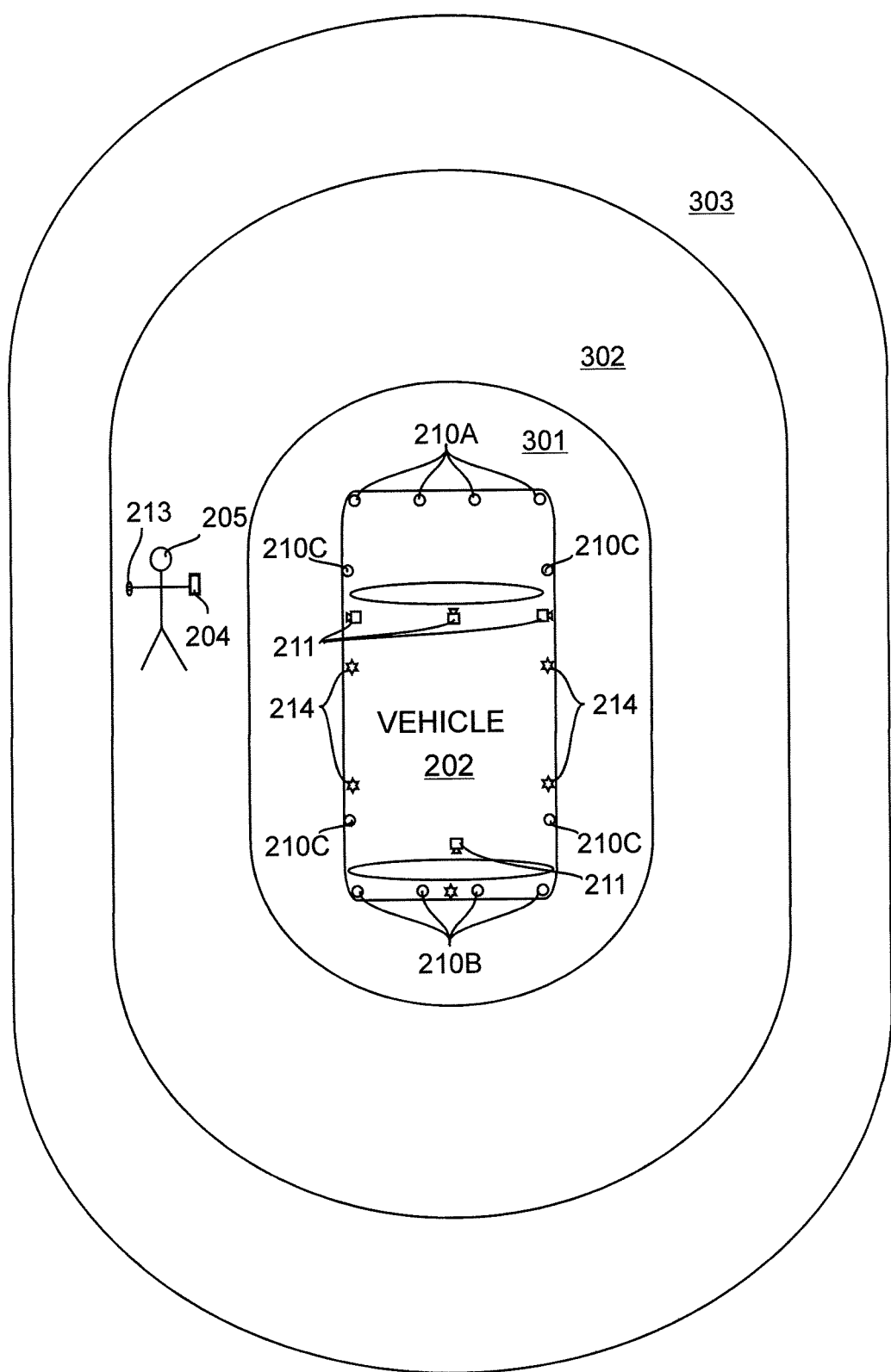
FIG. 3 shows a schematic plan view of the vehicle 202 and positions of the proximity sensors 210, cameras 211 and key detectors 214.

Positions of the proximity sensors 210, cameras 211 and key detectors 214 are shown in a schematic plan view of the vehicle 202 in FIG. 3. As is known, the proximity sensors 210 of the vehicle may be arranged at various positions around the periphery of the vehicle 202. In the present example there are 4 proximity sensors 210A located at different positions across the front of the vehicle and 4 proximity sensors 210B located at different positions across the rear of the vehicle 202. In addition, there are two proximity sensors 210C located on either side of the vehicle, for example in the wheel arches.

In this example the vehicle 202 also has 4 cameras 211, one each at the front, rear and sides of the vehicle 202. The vehicle 202 also has five key detectors 214 spaced at different positions around the periphery of the vehicle.

FIG. 3 also illustrates three zones 301, 302 and 303 that may be defined by the processing means 102. For example, the first zone 301 may be next to the vehicle 202 and extending up to a relatively short distance from the vehicle. The second zone 302 may surround the first zone and extend up to a larger distance from the vehicle 202, and the third zone 302 may surround the second zone and extend up to a still larger distance from the vehicle 202.

If the processing means 102 determines that the remote control device 204, the smart key 213 or another obstacle is within the first zone 301 it may limit the maximum speed of the vehicle 202 to a relatively low value (such as 1 kilometre per hour). The first zone may defined by an outer boundary within which the smart key 204 may be detected and/or within which an obstacle would be determined by one or more sensors 210A and/or cameras 211 to be within a threshold distance and/or the signal strength monitor 206 would indicate that the remote control device is within a threshold distance.

If the processing means 102 determines that the smart key 213 or any other obstacle are not within the first zone 301, and the remote control device 204 is within the second zone 302, it may limit the maximum speed of the vehicle 202 to a relatively larger value (such as 6 kilometres per hour).

If the processing means 102 determines that the smart key 213 or any other obstacle are not within the first zone 301, and the remote control device 204 is within the third zone 303, it may limit the maximum speed of the vehicle 202 to a relatively smaller value (such as 1 or 2 kilometres per hour). This enables the user 205 to ensure that the remote control device 204 is kept within the operating range of its communication link.

If the processing means 102 determines that that the remote control device 204 is outside of the outermost, third zone 303, it may reduce the maximum speed value to zero such that the vehicle is brought to a standstill.

Figure 4A:
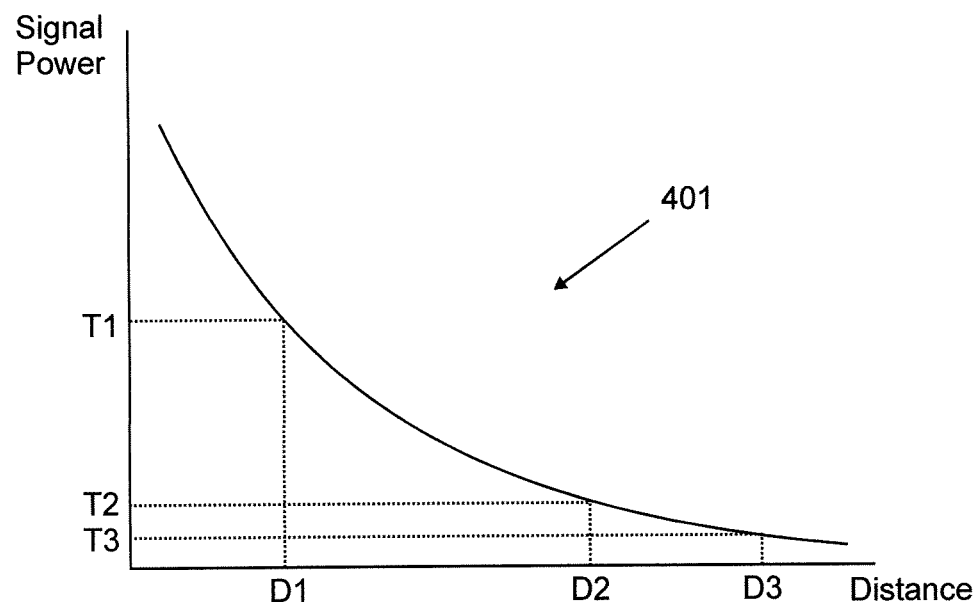
FIG. 4A shows a graph 401 illustrating how power of the received signal received at the radio unit 103 may decrease as distance separating the radio unit 103 and the remote control device 204 increases.
Figure 4B:
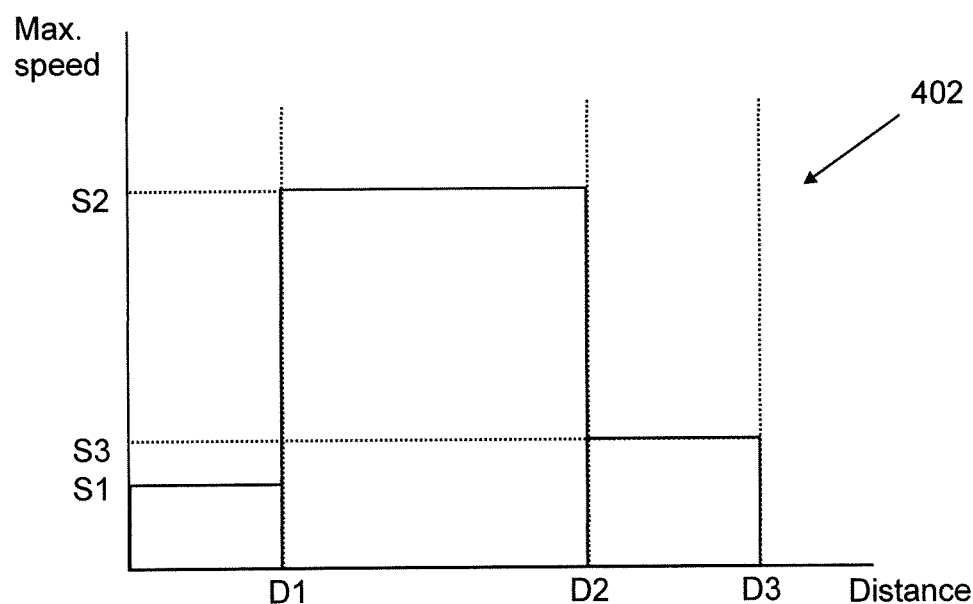
FIG. 4B shows a graph 402 illustrating an example of how a maximum speed value may be selected in dependence upon the determined distance between the radio unit 103 and the remote control device 204.

Graphs 401 and 402 illustrating an example of how the processing means 102 may determine a maximum speed value just from the signal received from the signal strength monitor 206 are shown in FIGS. 4A and 4B respectively. Graph 401 illustrates schematically how power of the received signal received at the radio unit 103 from the remote control device 204 may decrease as distance separating the radio unit 103 and the remote control device 204 increases. Graph 402 shows an example of how the maximum speed value may be selected in dependence upon the determined distance between the radio unit 103 and the remote control device 204.

As illustrated in graph 401, when the signal power is above a threshold value T1 it may be estimated that the distance separating the radio unit 103 and the remote control device 204 is relatively small and less than a first distance, D1. For distances up to D1 the maximum speed value may be set at a first speed, S1, that is relatively slow. When the signal power is below the threshold value T1 but above a second threshold value T2 it may be estimated that the distance separating the radio unit 103 and the remote control device 204 is between the first distance, D1, and a larger distance, D2. For such distances the maximum speed value may be set at a second speed, S2, that is relatively fast (for example 6 kilometres per hour). When the signal power is below the second threshold value, T2, but above a third threshold value, T3, it may be estimated that the distance separating the radio unit 103 and the remote control device 204 is between the second distance, D2, and an even larger distance, D3. For such distances the maximum speed value may be set at a third speed, S3, that is relatively slow compared to S2. When the signal power is below the third threshold value, T3, the processing means 102 may determine that the remote control device 204 is outside of an operational range for the system and reduce the maximum speed value to zero. That is, if the received signal strength is below the final threshold value (T3 in this example) then the motion of the vehicle is stopped.

In the example of FIGS. 4A and 4B, and FIG. 3, there are three distance ranges or zones where the vehicle may be remotely controlled and each distance range or zone has an associated maximum speed value. However, alternative examples are envisaged in which only two, or more than three, distance ranges or zones are defined by the processing means, and each distance range or zone has a respective associated maximum speed value.

Figure 5:
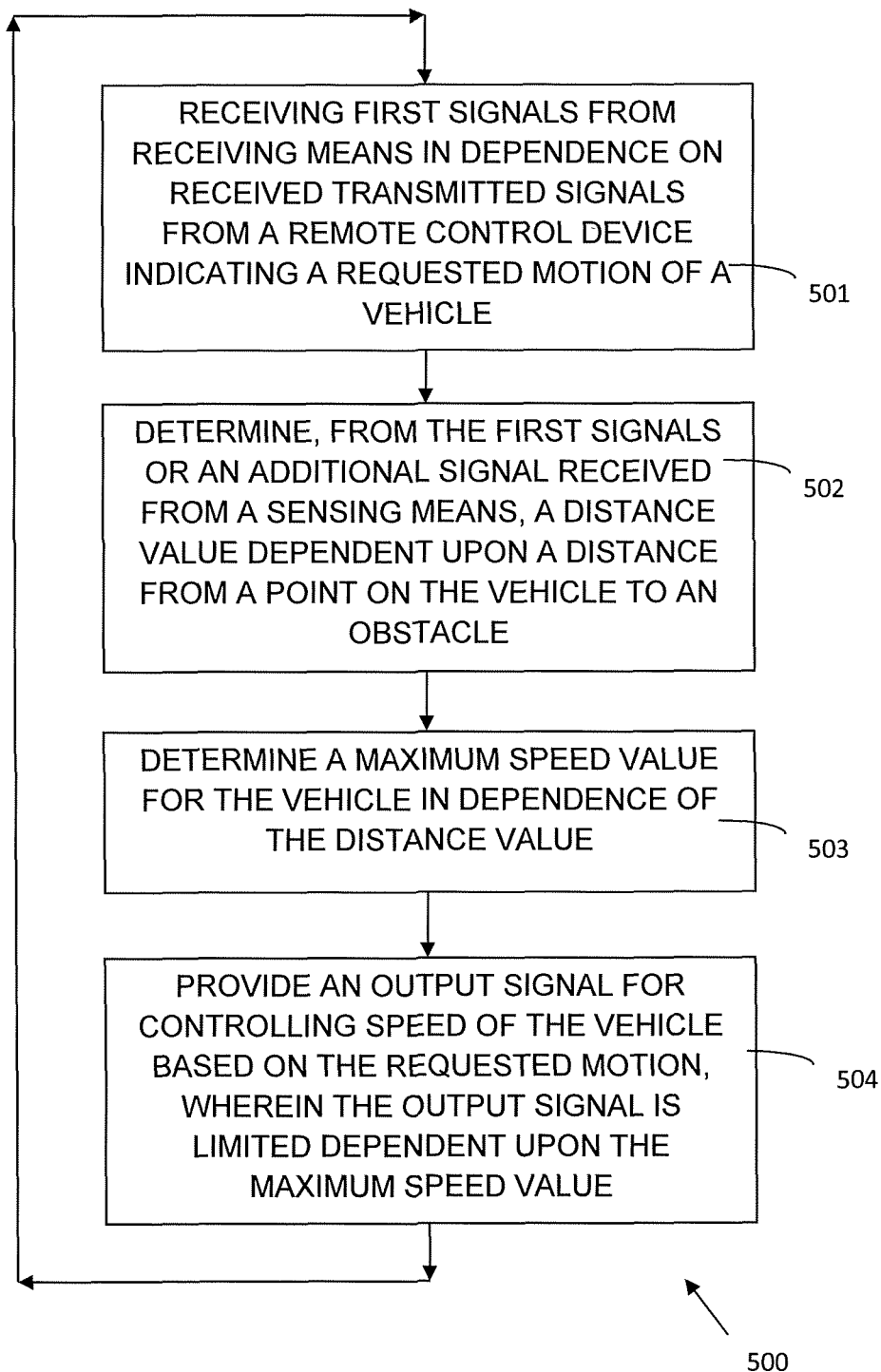
FIG. 5 shows a flowchart of a method 500 of controlling the movement of a vehicle.

A method 500 of controlling the movement of a vehicle is outlined by the flowchart shown in FIG. 5. At block 501 first signals are received from a receiving means in dependence on the receiving means receiving transmitted signals from a remote control device indicating a requested motion of a vehicle. The first signals may be dependent upon the signal strength of the received transmitted signals. Alternatively, the transmitted signals may comprise data dependent upon the location of the remote control device, for example the data may comprise positional data determined from a GNSS module in the remote control device, and the first signal may comprise the received data. In a further alternative embodiment, the remote control device may comprise a signal strength monitor that measures signal strength of signals transmitted by the radio unit of the vehicle and the remote control device then transmits signals to the radio unit of the vehicle that includes data dependent upon the measured signal strength. Thus, the first signals may comprise data that indicates signal strength of signals received by the remote control device from the vehicle.

At block 502 a distance value dependent upon a distance from a point on the vehicle to an obstacle is determined. The distance value may be determined from the first signals or an additional signal received from a sensing means, such as the proximity sensors 210 or cameras 211 of FIG. 2.

At block 503 a maximum speed value for the vehicle is determined in dependence on the distance value calculated at block 502.

At block 504 an output signal is provided for controlling speed of the vehicle based on the requested motion. The output signal is limited dependent upon the maximum speed value. That is, if the requested motion requires a speed that is less than a speed corresponding to the maximum speed value determined at block 503 then the output signal provided to the brakes and powertrain of the vehicle cause the vehicle to attain the required speed. Thus, the output signal may cause reduced braking and/or increased power from the powertrain, if the current speed of the vehicle is less than the required speed, or increased braking and/or decreased power from the powertrain, if the current speed is greater than the required speed.

However, if the requested motion requires a speed that is greater than a speed corresponding to the maximum speed value, then the output signal provided to the brakes and powertrain of the vehicle is limited so that the vehicle is only caused to attain the speed corresponding to the maximum speed value.

Blocks 501 to 504 are repeatedly performed. The remote control device repeatedly transmits signals to the radio unit of the vehicle indicating the currently requested movement of the vehicle, and the radio unit repeatedly receives the transmitted signal. The determination of a distance value is similarly repeated, either from the most recently received signal from the remote control device or from signals received from sensing means on the vehicle, or a combination of these signals. Similarly a maximum speed value is repeatedly determined at block 503 in order to set the limit on the output signal at block 504.

Figure 6:
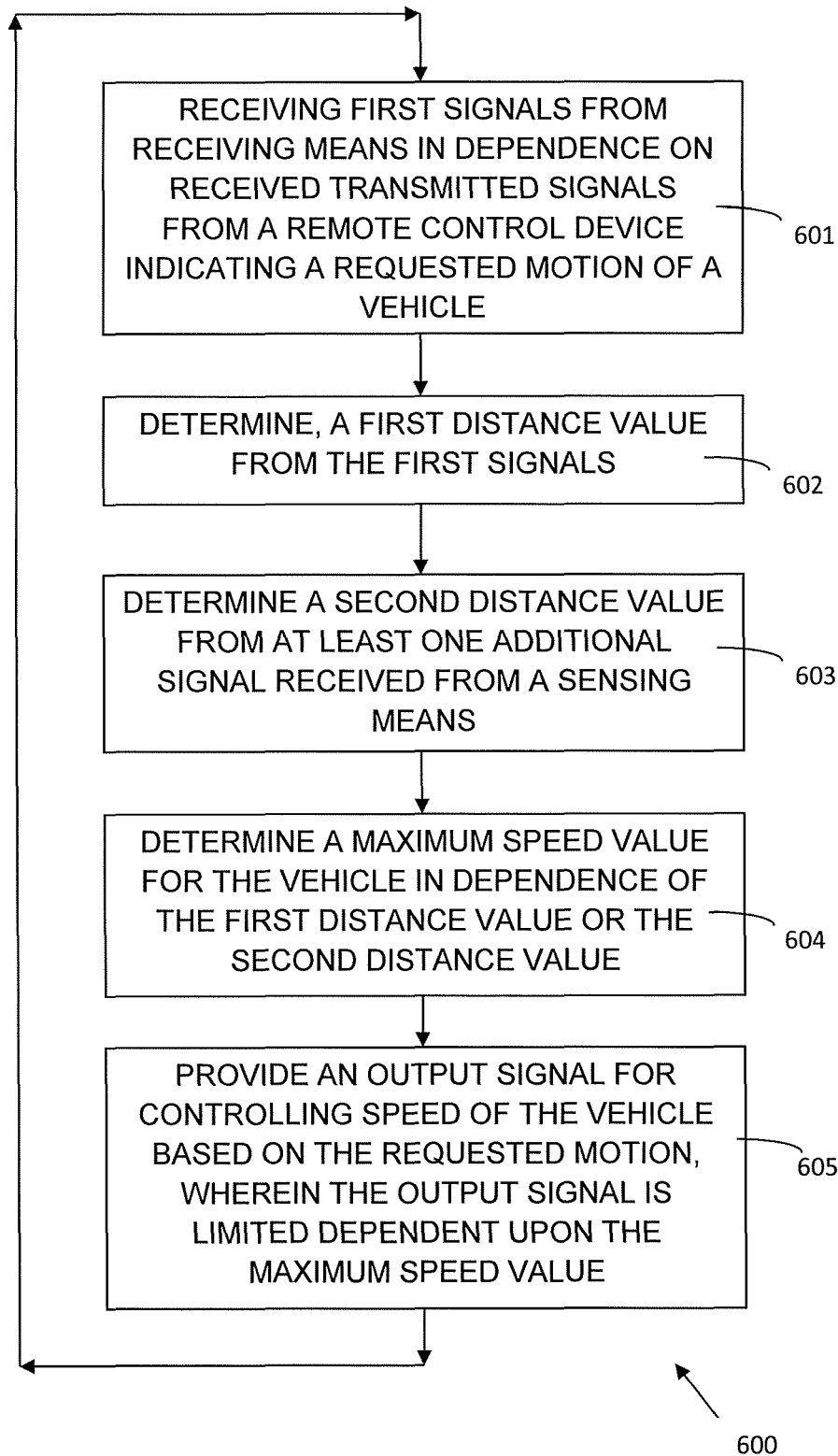
FIG. 6 shows a flowchart of a method 600 of controlling the movement of a vehicle.
Figure 8:
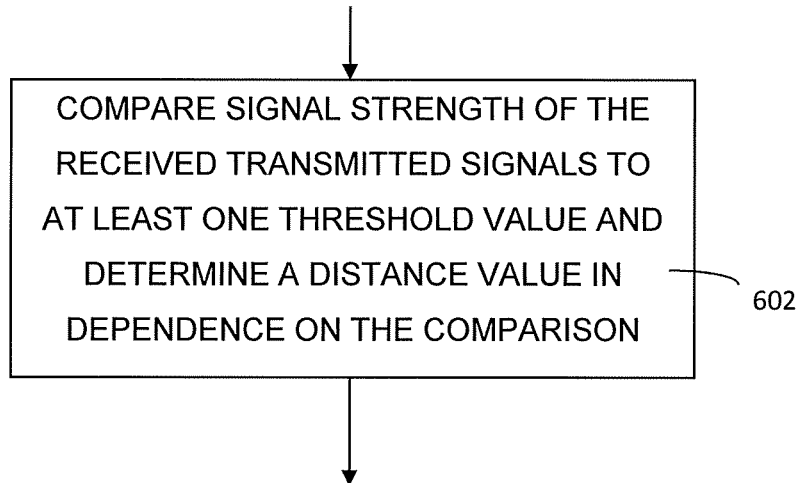
FIG. 8 shows a flowchart of an example of the process 602 of FIG. 6 of determining the first distance value.

A method 600 of controlling the movement of a vehicle is outlined by the flowchart shown in FIG. 6. At block 601 first signals are received from a receiving means in dependence on transmitted signals being received from a remote control device indicating a requested motion of a vehicle. Block 601 may be the same as block 501 described above. At block 602, a first distance value is determined from the first signals. An example of the process 602 of determining the first distance value is shown in the flowchart of FIG. 8. The signal strength of received transmitted signals, such as the signals transmitted by the remote control device 204 of FIG. 2 and received by the radio unit 103, is compared to at least one threshold value to determine a distance value in dependence on the comparison. Thus, this process is as described above with regard to the graphs of FIGS. 4A and 4B.

Figure 9:
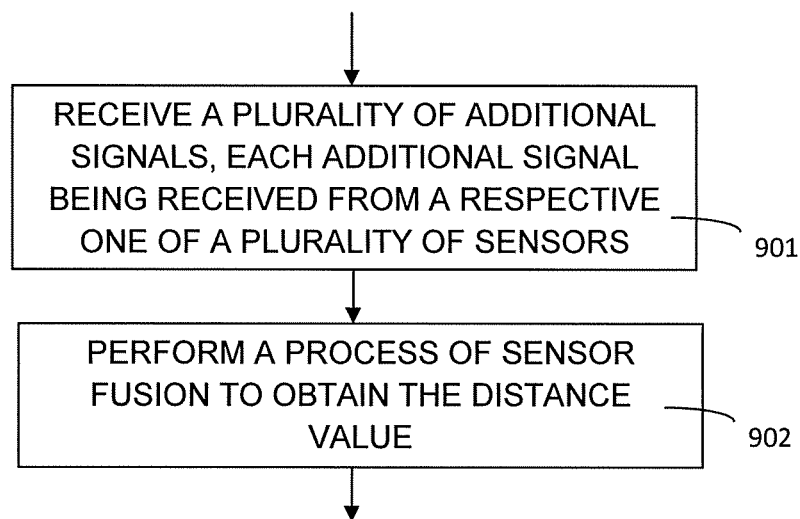
FIG. 9 shows an example of the process of block 603 of FIG. 6.

At block 603 a second distance value is determined from at least one additional signal received from a sensing means. An example of the process of block 603 is shown in the flowchart of FIG. 9. At block 901 a plurality of additional signals are received, for example by the processing means 102 of FIG. 2. Each additional signal may be received from a respective one of a plurality of sensors, such as proximity sensors 210 or cameras 211. At block 902 a process of sensor fusion may be performed to obtain the second distance value. As an alternative to the processes of FIG. 9, the process at block 603 may comprise receiving the additional signal(s) from a single sensor or the additional signal may be the result of fusion of several sensors performed prior to receipt by the processing means 102.

Figure 10:
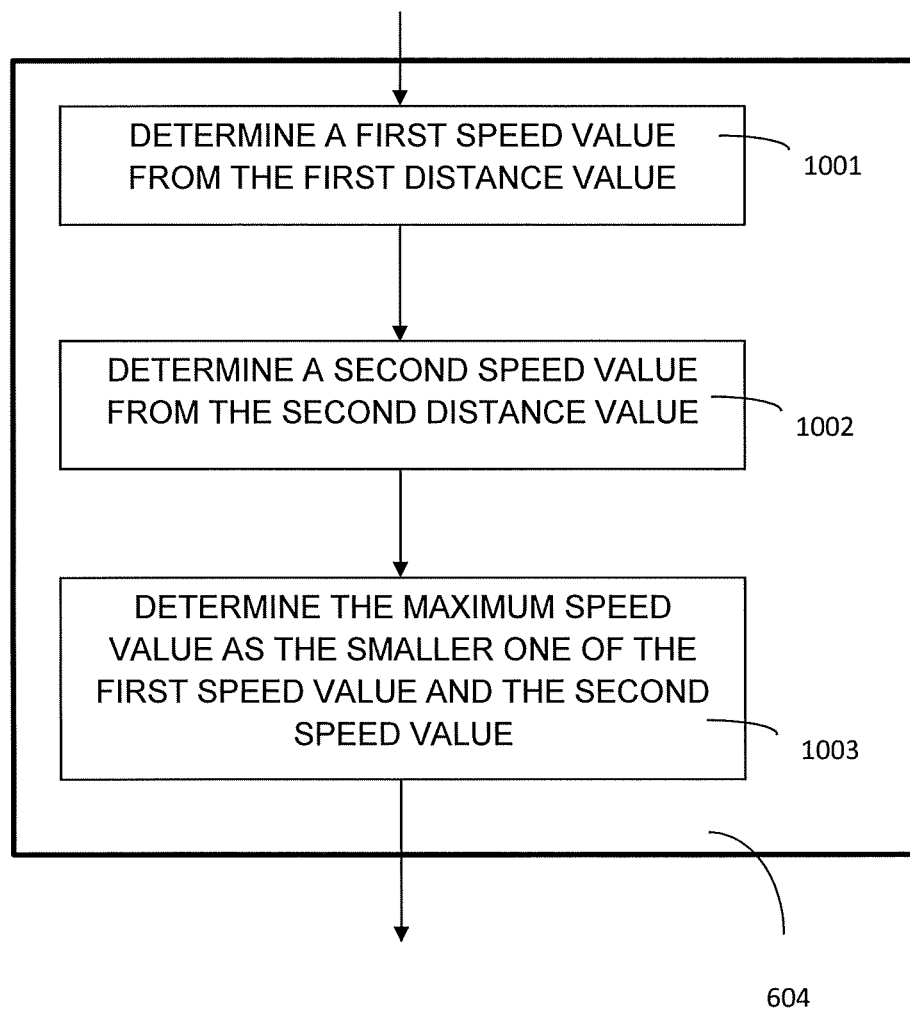
FIG. 10 shows a flowchart of example processes that may be included in the process block 604 of FIG. 6.

At block 604 a maximum distance value is determined for the vehicle in dependence on the first distance value or the second distance value found at block 603. For example, at block 604, the first and second distance values may be compared and the smallest distance value may be used to determine the maximum speed value. Alternatively, as shown in FIG. 10, the process at block 604 may comprise determining a first speed value from the first distance value at block 1001 and determining a second speed value from the second distance value at block 1002. A maximum speed value may then be determined as the smaller one of the first speed value and the second speed value at block 1003.

For example, the second distance value may indicate that the nearest obstacle to the vehicle is in the second zone 302 of FIG. 3 and therefore a relatively high second speed value may be determined, but the first distance value may indicate that the person 205 using the remote control device 204 is within the third zone 303 of FIG. 3 and therefore a relatively low first speed value may be determined. That is, a first speed value may be determined that is lower than the second speed value. Consequently, the maximum speed value is determined at block 1003 to be the relatively low first speed value, rather than the speed value determined in respect of the nearest obstacle.

Following block 604, an output signal for controlling the speed of the vehicle based on the requested motion is provided at block 605. For example, the output signal may cause reduced braking and/or increased power from the powertrain, if the current speed of the vehicle is less than the required speed, or increased braking and/or decreased power from the powertrain, if the current speed is greater than the required speed. However, the output signal is limited dependent upon the maximum speed value that was determined at block 604, so that the speed of the vehicle does not exceed a speed corresponding to the maximum speed value. For example, the requested motion of the vehicle may include a speed that is greater than a speed corresponding to the maximum speed value determined at block 604, in which case the output signal is limited in order to limit the speed of the vehicle to a speed corresponding to the maximum speed value.

Figure 7:
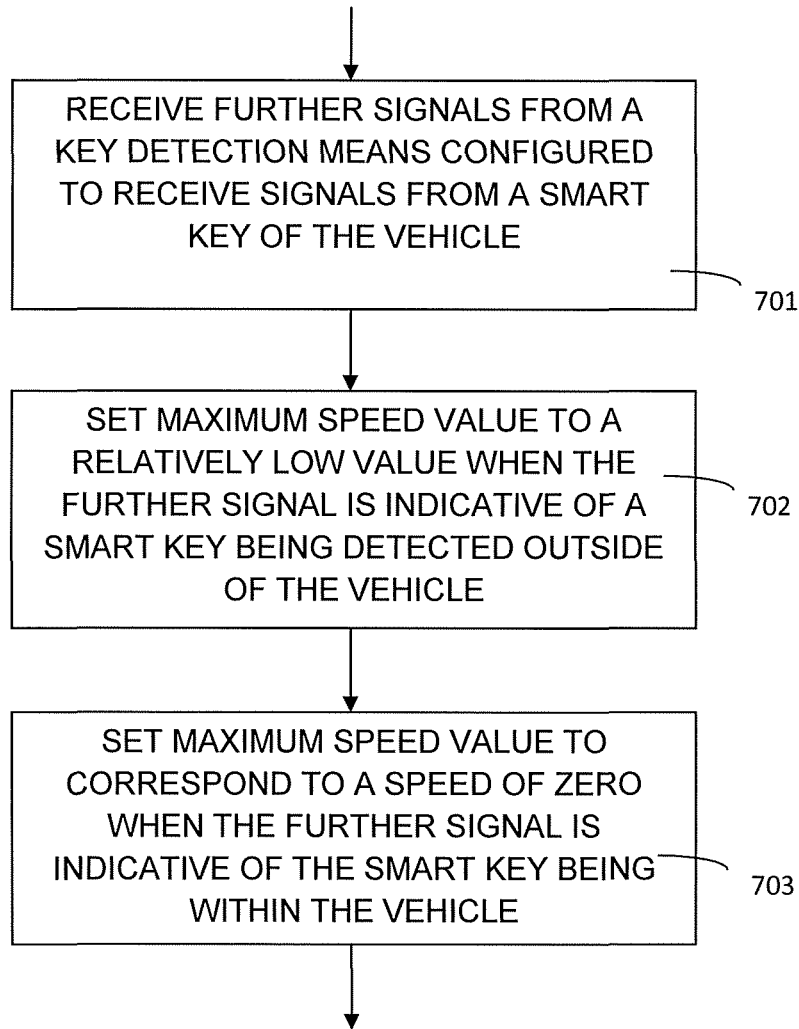
FIG. 7 shows a flowchart of additional processes 701, 702 and 703 that may be incorporated into the method 500 of FIG. 5 or the method 600 of FIG. 6.

A flowchart showing additional processes 701, 702 and 703 that may be incorporated into the method 500 of FIG. 5, for example following block 503, or the method 600 of FIG. 6, for example following block 604, are shown in FIG. 7. At block 701 a further signal is received, for example by processor 102, from a key detection means, such as apparatus 212, that is configured to receive signals from a smart key of the vehicle. At block 702 the maximum speed value is set to a relatively low value when the further signal is indicative of a smart key being detected outside of the vehicle. Thus, this maximum speed value determined at block 702 may be used in preference to the maximum speed value determined previously at blocks 503 or 604.

At block 703 the maximum speed value is set to correspond to a vehicle speed of zero when the further signal is indicative of the smart key being within the vehicle.

For purposes of this disclosure, it is to be understood that the processing means described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The blocks illustrated in the FIGS. 5 to 10 may represent steps in a method and/or sections of code in the computer program 107. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. Apparatus for controlling movement of a vehicle, the apparatus comprising processing means that, in a remote control mode, is configured to:

receive a first signal from a receiving means in dependence on a transmitted signal received from a remote control device indicating a requested motion of a vehicle;

receive a further signal from a key detection means configured to receive a key signal from a smart key for the vehicle;

determine, from the first signal or from an additional signal received from a sensing means, one or more distance values, the or each distance value being indicative of a distance from a point on the vehicle to an object;

determine a maximum speed value for the vehicle in dependence on at least one of the one or more distance values and on the further signal being indicative of a smart key being detected; and provide an output signal for controlling speed of the vehicle based on the requested motion, wherein the output signal is arranged to control the speed of the vehicle to be less than or equal to the maximum speed value, wherein in the remote control mode the processing means is configured to provide an output signal to cause the vehicle to be stationary in dependence on the further signal being indicative of the smart key being within the vehicle.

* * * * *